Sept. 7, 1965   W. A. LAMBERTSON ETAL   3,205,465
THERMISTOR ASSEMBLY
Filed Sept. 26, 1960

INVENTORS
WINGATE A. LAMBERTSON
PAUL E. CARROLL
BY
ATTORNEY

United States Patent Office 3,205,465
Patented Sept. 7, 1965

3,205,465
THERMISTOR ASSEMBLY
Wingate A. Lambertson, Grand Island, and Paul E. Carroll, Tonawanda, N.Y., assignors to The Carborundum Company, Niagara Falls, N.Y., a corporation of Delaware
Filed Sept. 26, 1960, Ser. No. 58,238
8 Claims. (Cl. 338—22)

This invention relates to electrical resistance bodies, and more particularly to thermistor assemblies including a single crystal of a silicon carbide.

A thermistor, as the term is employed herein, is an electrical resistance body having a high sensitivity to changes in temperature over a wide temperature range. Thus its electrical resistance is sensitive to change with changes in temperature. Thermistors which decrease in resistivity with increase in temperature are said to have a negative temperature coefficient of resistivity.

Thermistors are widely employed in temperature measuring and controlling devices and their uses have grown very rapidly in recent years. Among present uses of thermistors are included replacements for thermocouples, especially for use at moderate temperatures up to about 600° F. In this application they offer several advantages over thermocouples, since they are more sensitive to temperature change than thermocouples. Furthermore, thermocouples produce a relatively weak signal which must be amplified to actuate controlling circuits, whereas thermistors are adapted to actuate relays directly, thereby minimizing the cost of control equipment. Thermistors are also used to compensate for changes in ambient temperature in order to maintain the accuracy of electrical measuring equipment over wide ranges of ambient temperature. Thermistors are also useful in time-delay applications.

It is an important object of the present invention to provide novel thermistor assemblies.

A further object is to provide thermistor assemblies made of a single crystal of pure silicon carbide or of a selected silicon carbide characterized by the presence throughout the body thereof of an element from Groups IIA and VA of the periodic chart.

A further object is to provide a thermistor assembly made up of a silicon carbide crystal and having electrical leads joined to isolated points of said crystal by high temperature fusion only.

Figure 1:
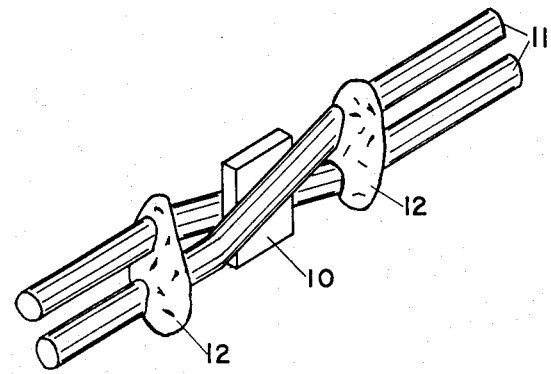
Figure 2:
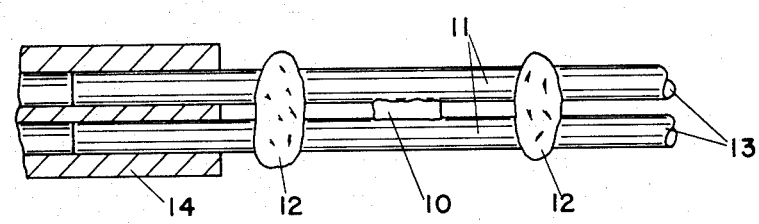

These and other objects and advantages accruing from the invention will become more apparent from the following description and the acompanying drawings, wherein FIG. 1 is a perspective view of a thermistor assembly made in accordance with the present invention; and FIG. 2 is a top plan view of an operating device embodying the thermistor of FIG. 1.

In accordance with the present invention a selected silicon carbide, in the form of a single crystal, is positioned between at least two electrically-conductive leads and in direct contact therewith. The parts are then secured in relationship to each other as by the spring tension of the leads and thereafter subjected to a temperature sufficient to fuse the leads directly to contact points of the crystal. The fusion is preferably performed in a protective atmosphere such as argon, helium, hydrogen or vacuum to avoid oxidation of the leads and the silicon carbide.

The fusion can be effected in two different ways. In one method of fusion, which has been employed in the present invention, the electrical leads are heated by their inherent resistance by passing an electrical current therethrough to bring them to fusion temperature for a sufficient interval of time to effect the fusion and joinder, As an alternative of this method, a heating circuit can be established from a source of current through one lead, thence through the crystal, back through the other lead, and to the source of current.

In a second method, the entire assembly is placed in a furnace and raised to a temperature at which the fusion will be effected.

As will be seen in the drawings, thermistor assemblies of the present invention include a single crystal 10 of silicon carbide which is positioned between two electrical leads 11. The parts are assembled and held in fixed relationship to each other and heated to fusion temperature by one of the methods hereinbefore described to join the electrical leads to isolated points of the crystal. As shown in FIG. 1, a globule of ceramic or porcelain cement 12 is thereafter placed on either side of the crystal 10, in surrounding relationship to the electrical leads and is allowed to harden to hold the parts in fixed, assembled relationship, and to strengthen the assembly.

An operating device, made in accordance with the present invention is illustrated in FIG. 2. As shown in this latter figure, the crystal 10 of silicon carbide is fused between two isolated electrical leads 11 which are supported on either side of the crystal by globules of ceramic cement 12. The terminal ends 13 of the electrical leads are exposed to the atmosphere, beyond the ceramic cement. However, the other ends of the electrical leads extend into a twin conduit porcelain insulator 14 which can be a part of a probe assembly, of which the thermistor assembly forms a part.

Silicon carbide crystals applicable to use in the present invention include the following 5 types:

(1) *Intrinsic.*—This designation relates to theoretically pure silicon carbide. Intrinsic silicon carbide would provide a high resistivity material with a very high sensitivity to temperature changes. It would have a B value of 27,600° K.

The B value or characteristic is a measure of the sensitivity of the resistance of the body to temperature change over a given range of temperature. It is calculated from the formula $$B = \frac{2.303 \log \frac{R_1}{R_2}}{\frac{1}{T_1} - \frac{1}{T_2}}$$

wherein $R_1$ equals the resistance in ohms at temperature ($T_1$) and $R_2$ equals the resistance in ohms at temperature ($T_2$) and $T_1$ and $T_2$ are temperatures in degrees Kelvin.

(2) *Compensated.*—This designation relates to silicon carbide having P-type and N-type impurities in balanced amounts, in trace quantities of only a few parts per million. Compensated silicon carbide may have a resistivity from about 100 ohm-cm. to $10^4$ ohm-cm. at room temperature, depending upon how well compensated the particular material happens to be. Commercial colorless silicon carbide is a typical compensated material and has a B value of about 2000° K. Commercial colorless crystals are obtained by selecting them from commercial green crude silicon carbide.

(3) *P-type.*—This designation relates to silicon carbide characterized by electrical conduction by positive charge carriers. The positive charge carriers are pictured as the absence of electrons (holes). A P-type semiconductor contains a small but effective amount of trivalent impurity such as elements from column IIIA of the periodic chart, which cause impurity semiconduction by motion of positive electrical charge carriers. These include boron, aluminum and gallium in trace amounts.

Commercial black silicon carbide contains P-type crystals which usually have a room temperature electrical resistivity in the range from about 0.1 to about 1 ohm-cm., depending upon the concentration of impurity.

P-type silicon carbide crystals having an impurity level sufficiently high to impart a resistivity of about 10 ohm-cm. could be quite useful as a high wattage thermistor.

In the P-type materials, aluminum and boron provide B values of about 2500° K.

(4) *N-type.*—This designation relates to silicon carbide in which electrical conduction occurs by motion of negative charge carriers. The resistivity is low, being in the range from about 0.01 to 0.1 ohm-cm., and it is characterized by low sensitivity to thermal change.

Commercial green silicon carbide contains N-type crystals, the presence of nitrogen therein in trace amounts contributing N-type characteristics. A B value of about 1250° K. is provided by nitrogen.

Phosphorus and arsenic in trace amounts also contribute N-type characteristics. Thus the N-type materials include nitrogen, phosphorus and arsenic, representing Group VA of the periodic chart of the elements.

N-type silicon carbide would be quite useful as a thermistor for very low temperature indications in the vicinity of the temperature of liquid oxygen. The low resistivity and the low temperature sensitivity of resistivity of N-type silicon carbide would be an advantage in this range. P-type and N-type silicon carbide, of the 5 materials contemplated for use in the present invention, are of the lowest resistivity, and the resistivity will depend upon the concentration of impurities. However, the same amounts of impurities of the P-type silicon carbide would be higher in resistivity than the N-type silicon carbide. Likewise the temperature sensitivity of resistivity for the P-type material would be higher than that for the N-type material.

(5) *Boron solid solution with silicon carbide.*—This material is readily distinguishable from P-type silicon carbide. The P-type silicon carbide containing boron is lower in resistivity, the boron level being in the range below 0.01%. However, the solid solution of boron in silicon carbide, boron content above about 1%, shows an increase in resistivity due to the distortion of the silicon carbide lattice.

The crystals of boron solid solution with silicon carbide are obviously different from normal silicon carbide crystals; they have a definite fish scale appearance, whereas, silicon carbide crystals show definite formations of hexagonal crystal faces. There is also a definite shift in the X-ray diffraction lines produced from the crystals of boron solid solution with silicon carbide. This is proof that the normal silicon carbide crystal lattice has been distorted and the spacing between individual atoms has been changed.

The crystals of boron solid solution with silicon carbide can be formed by two methods. In one method, silicon carbide is recrystallized in the presence of boron. In the other method the crystals are formed directly from a mix containing silicon carbide-forming ingredients, namely $SiO_2$ and carbon, and a desired amount of boron.

Thermistors made in accordance with the present invention, from boron solid solutions with silicon carbide have generally displayed B values in the range from about 1200° K. to about 1800° K.

A thermistor or boron solid solution with silicon carbide is advantageous because the electrical properties are not sensitive to minor fluctuations of boron content. For example, when boron in the range from about 1 to about 10% is added to the mix before the crystals are formed by recrystallization, there is very little difference in the resistivity of the resultant crystals at room temperature. A boron content from about 1 to about 3% by weight is provided by the above additions of boron.

The following specific examples illustrate and highlight the present invention.

*Example I*

A pair of tungsten lead wires approximately 0.005 inch in diameter were supported at their ends by spot welding to the ends of larger diameter nickel wires and a crystal of compensated silicon carbide approximately 0.05 inch square by 0.01 inch thick was positioned therebetween with the opposite major surfaces of the crystal contacting the leads. The crystal was held by the spring tension of the leads.

Thereafter alternating current at 2.5 amperes and 6–8 volts was run through the leads until they were heated to a temperature of about 1950° C., which was maintained for a period of about 5 seconds to weld the leads to the crystal. The assembly was then cooled and globules of ceramic cement were applied to the lead wires adjacent the crystal to strengthen the assembly.

The thermistor so produced had a B value of 1860° K.

*Example II*

A pair of tungsten lead wires approximately 0.005 inch in diameter were supported at their ends by spot welding to the ends of larger diameter nickel wires and a crystal of boron solid solution with silicon carbide containing about 3% by weight of boron, approximately 0.05 inch square by 0.01 inch thick was positioned therebetween with the opposite major surfaces of the crystal contacting the leads. The crystal was held by the spring tension of the leads.

Thereafter alternating current at 2.5 amps and 6–8 volts was run through the leads until they were heated to a temperature of about 1950° C., which was maintained for a period of about 5 seconds to weld the leads to the crystal. The assembly was then cooled and globules of ceramic cement were applied to the lead wires adjacent the crystal to strengthen the assembly.

The thermistor so produced had a B value of 1500° K.

The amount of the Groups IIIA and VA elements to be included within silicon carbide crystals of the present invention will be in the range from a significant i.e. trace, amount up to about 5% by weight of the crystal.

Electrical leads adapted to use in the present invention are of a selected number. It has been found that those made of substantially pure tungsten and substantially pure tantalum are preferred. However, it is to be included within the scope of the invention to utilize leads made of tungsten-tantalum alloys and of alloys of tungsten and tantalum with other alloying metals. Rhenium, molybdenum and iridium are also definite possibilities. Other metals such as iron, cobalt, nickel, rhodium and platinum can be used. However, when the latter metals are used, some free silicon should be added at the interface, otherwise a graphite layer tends to form at the interface between the metal and the crystal which weakens the bond.

The lead wires can be placed on opposite faces of the crystal to form a thermistor, and this is a convenient way to form the device. Also the lead wires can be attached to opposite edges of the crystals or to isolated points on one face of the crystal. In forming the thermistor, the crystal is preferably supported between leads by the spring tension of the leads so that no extraneous supporting structure is present to contaminate the finished thermistor.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

We claim:

1. A thermistor assembly, comprising a single crystal of a silicon carbide selected from the group consisting of pure silicon carbide and silicon carbide modified by the presence throughout the body thereof of at least one element selected from Groups IIIA and VA of the periodic chart, said element being present in an amount ranging from a trace amount up to about 5% by weight of said crystal, and electrical leads made of substantially pure tungsten and joined by high temperature fusion directly to isolated points of said crystal.

2. A thermistor assembly, comprising a single crystal of a silicon carbide selected from the group consisting of pure silicon carbide and silicon carbide modified by the presence throughout the body thereof of at least one element selected from Groups IIIA and VA of the periodic chart, said element being present in an amount ranging from a trace amount up to about 5% by weight of said crystal, and electrical leads made of an alloy of tungsten and tantalum and joined by high temperature fusion directly to isolated points of said crystal.

3. A thermistor assembly, comprising a single crystal of a silicon carbide selected from the group consisting of pure silicon carbide and silicon carbide modified by the presence throughout the body thereof of at least one element selected from Groups IIIA and VA of the periodic chart, said element being present in an amount ranging from a trace amount up to about 5% by weight of said crystal, and electrical leads made of substantially pure tantalum and joined by high temperature fusion directly to isolated points of said crystal.

4. A thermistor assembly, comprising a single crystal of boron solid solution with silicon carbide, the boron being present in an amount in the range from about 1% by weight to about 5% by weight of said crystal, and at least two electrical leads made of substantially pure tungsten and joined by fusion directly to isolated points of said crystal.

5. A thermistor assembly, comprising a single crystal of colorless silicon carbide containing balanced trace amounts of P-type and N-type impurities, said crystal having a size of about 0.05 inch square by about 0.01 inch thick, and tungsten leads about 0.005 inch in diameter joined by fusion directly to isolated points of said crystal.

6. A thermistor according to claim 5 wherein the isolated points are on opposite major surfaces of said crystal.

7. A thermistor assembly, comprising a single crystal of boron solid solution in silicon carbide containing about 3% by weight based on said crystal of boron, said crystal having a size of about 0.05 inch square by about 0.01 inch thick, and two tungsten leads about 0.005 inch in diameter joined by fusion directly to isolated points of said crystal.

8. A thermistor according to claim 7 wherein the isolated points are on opposite major surfaces of said crystal.

References Cited by the Examiner
UNITED STATES PATENTS

| | | | |
|---|---|---|---|
| 1,023,485 | 4/12 | Thowless | 338—352 |
| 1,060,989 | 5/13 | Lyle | 338—329 |
| 1,787,749 | 1/31 | Heyroth | 252—504 |
| 2,273,704 | 2/42 | Gridsdale | 338—352 |
| 2,854,364 | 9/58 | Lely | 148—1.5 |
| 2,916,460 | 12/59 | Van der Beck | 252—516 |

OTHER REFERENCES

Fetterley: "Electrical Conduction in Silicon Carbide," Technical Review, May 1957, pages 322–327.

RICHARD M. WOOD, *Primary Examiner.*

RAY K. WINDHAM, *Examiner.*